US006426443B1

(12) United States Patent
Rossin et al.

(10) Patent No.: US 6,426,443 B1
(45) Date of Patent: *Jul. 30, 2002

(54) CATALYTIC PROCESS FOR THE DECOMPOSITION OF PERFLUOROALKANES

(75) Inventors: Joseph A. Rossin, Forest Hill; Scott M. Maurer, Bel Air, both of MD (US)

(73) Assignee: Guild Associates, Inc., Dublin, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/580,889

(22) Filed: May 30, 2000

Related U.S. Application Data

(62) Division of application No. 08/662,129, filed on Jun. 12, 1996, now Pat. No. 6,069,291.

(51) Int. Cl.[7] .................................................. A62D 3/00
(52) U.S. Cl. ................ 588/206; 423/240 S; 423/245.1
(58) Field of Search ................................. 588/206, 213, 588/214, 248, 226; 423/240 S, 245.1, 245.3

(56) References Cited

U.S. PATENT DOCUMENTS

| | | | |
|---|---|---|---|
| 3,760,565 A | 9/1973 | Fish | 55/71 |
| 3,899,444 A | 8/1975 | Stephens | 252/455 |
| 3,980,584 A | 9/1976 | Dronov et al. | 252/432 |
| 3,983,072 A | 9/1976 | Stephens | 252/466 |
| 4,053,557 A | 10/1977 | Kageyama | 423/240 |
| 4,059,683 A * | 11/1977 | Lindberg et al. | 423/481 |
| 4,092,403 A | 5/1978 | Rectenwald et al. | 423/488 |
| 4,390,456 A | 6/1983 | Sanchez et al. | 252/448 |
| 4,435,379 A | 3/1984 | Olson et al. | 423/472 |
| 4,459,372 A | 7/1984 | Arenn | 502/351 |
| 4,587,116 A | 5/1986 | Livingston et al. | 423/415 |
| 4,810,685 A | 3/1989 | Twigg et al. | 502/60 |
| 4,868,150 A | 9/1989 | Spooner et al. | 502/439 |
| 5,151,263 A | 9/1992 | Okazaki et al. | 423/659 |
| 5,176,897 A * | 1/1993 | Lester | 423/659 |
| 5,276,240 A | 1/1994 | Timmons et al. | 585/642 |
| 5,276,249 A | 1/1994 | Greene et al. | 588/206 |
| 5,283,041 A | 2/1994 | Nguyen et al. | 423/240 |
| 5,290,429 A * | 3/1994 | Delaney et al. | 208/145 |
| 5,396,022 A | 3/1995 | Wu et al. | 585/852 |
| 5,416,247 A * | 5/1995 | Webster | 588/206 |
| 5,430,230 A | 7/1995 | Mitsui et al. | 588/206 |
| 5,457,268 A | 10/1995 | Greene et al. | 588/207 |
| 5,622,682 A * | 4/1997 | Tom | 423/230 |
| 5,863,515 A | 1/1999 | Davis et al. | 423/628 |
| 6,023,007 A | 2/2000 | Nakajo et al. | 588/205 |
| 6,069,291 A * | 5/2000 | Rossin et al. | 588/206 |
| 6,110,436 A | 8/2000 | Scholz et al. | 423/240 |

FOREIGN PATENT DOCUMENTS

| | | | |
|---|---|---|---|
| EP | 0 475 442 A1 | 12/1998 | B01D/53/36 |
| EP | 0 885 648 A1 | 12/1998 | B01D/53/86 |
| GB | 2 066 690 | 7/1981 | B01J/23/74 |
| JP | 57-7254 | 1/1982 | B01J/23/40 |
| JP | 57-7255 | 1/1982 | B01J/23/60 |
| JP | 07080303 | 3/1995 | B01J/23/24 |
| JP | 9-57103 | 4/1997 | B01J/23/63 |
| JP | 9-253453 | 9/1997 | B01D/53/94 |
| JP | 10-66867 | 3/1998 | B01J/21/16 |
| JP | 10192653 | 7/1998 | B01D/53/86 |

OTHER PUBLICATIONS

Bickle et al, Catalytic Destruction of Chlorofluorocarbons and Toxic Chlorinated Hydrocarbons, Appl. Catal. B:Env., 1994, pp. 141–153, Elservier, Amsterdam, no month.

Bond & Sadeghi, Catalysed Destruction of Chlorinated Hydrocarbons J. Appl. Chem. Biotechnol. 1975, pp. 241–248, Society of Chemical Industry, London, no month.

Burdenduic & Crabtree, Mineralization of Chlorofluorocarbons and Aromatization of Saturated Fluorocarbons by a Convenient Thermal Process, Science, 1996, pp. 340–341, Amer. Assoc. for the Advancement of Science, D.C., Jan.

Campbell & Rossin, Catalytic Oxidation of Perfluorocyclobutene over a 1% Pt/TiO$_2$ Catalyst, paper presented at the 14th N. Amer. Catalysis Society Meeting, 1995 (28 pp.), no month.

Fan & Yates, Infared Study of the Oxidation of Hexafluoropropene On TiO$_2$, J. Phys. Chem. 1994, pp. 10621–10627, Americal Chemical Society, Easton, PA, no month.

Farris et al, Deactivation of a Pt/ Al$_2$O$_3$ Catalyst During the Oxidation of Hexafluoropropylene, Catal. Today, 1992, pp. 501–516, Elservier, Amsterdam, no month.

Karmakar & Green, An Investigation of CFC12 (CCL$_2$F$_2$) Decomposition on TiO$_2$ Catalysts, J. Catal., 1995, pp. 394–406 Academic Press, San Diego, no month.

Langan, et al., "Strategies for greenhouse gas reduction," Solid State Technology, pp. 115–122, (Jul. 1996).

Nagata et al, Catalytic Oxidative Decomposition of Chlorofluorocarbons (CFCs) in the Presence of Hydrocarbons, Applied Catalysts B: Environmental, 1994, pp. 23–31, Elsevier, Amsterdam, no month.

Okazaki & Kurosaki; Decomposition of Chlorofluorocarbons by the Reaction with Water Vapor Catalyzed by Iron Oxide Supported on Activated Carbon, pp. 1901–1904, Chemistry Letters, 1989, no month.

PCT/US 99/21376, Jan. 28, 2000.

\* cited by examiner

*Primary Examiner*—Steven P. Griffin
*Assistant Examiner*—Edward M. Johnson
(74) *Attorney, Agent, or Firm*—Baker Botts L.L.P.

(57) ABSTRACT

A process and composition for transforming perfluoroalkanes in the presence of an oxidizing agent and water at temperatures between about 400 to 1,000° C. Aluminum oxide is the primary agent for effecting this transformation. Additions of between 0.1 to 50% by weight of other components such as barium calcium, phosphorus, cerium, chromium, cobalt, iron, lanthanum, magnesium, nickel, silicon, titanium, yttrium or zirconium aid in extending the useful life of the catalyst. A preferred catalyst composition includes aluminum oxide with additions of cobalt and one or more of the elements of cerium, titanium or zirconium.

20 Claims, No Drawings

US 6,426,443 B1

CATALYTIC PROCESS FOR THE DECOMPOSITION OF PERFLUOROALKANES

This application is a division of Ser. No. 08/662,129 filed Jun. 12, 1996 now U.S. Pat. No. 6,069,291.

TECHNICAL FIELD

The present invention relates generally to a catalytic process and particularly to the treatment of perfluoroalkanes. Perfluoroalkanes represent a specific group of halogen-containing compounds consisting of straight, branched and cyclic alkanes that are composed of only carbon and fluorine atoms.

BACKGROUND ART

Perfluoroalkanes refer to a specific group of halogen-containing compounds that are composed of only carbon and fluorine atoms and do not possess double or triple bonds. Perfluoroalkanes differ from, for example, chlorofluorocarbons (CFC's), hydrochlorofluorocarbons (HCFC's) and hydrofluorocarbons (HFC's) in that perfluoroalkanes do not contain hydrogen, chlorine or heteroatoms other than fluorine. Perfluoroalkanes are released to the environment during certain industrial processes, such as electrolytic aluminum smelting for example, as by-products during the manufacture of tetrafluoroethylene, and during semiconductor manufacturing processes. Examples of perfluoroalkanes include carbon tetrafluoride ($CF_4$), hexafluoroethane ($C_2F_6$), octafluoropropane ($C_3F_8$), octafluorocyclobutane ($C_4F_8$) and decafluoroisobutane ($C_4F_{10}$) Perfluoroalkanes represent some of the most stable compounds known (Kiplinger et al. *Chem. Rev.* p. 373 (1994). The stability of perfluoroalkanes makes these compounds difficult to decompose or convert to useful products, such as for example the conversion of perfluoroalkanes to perfluoroalkenes. Also, this highly stable characteristic make perfluoroalkanes released into the atmosphere undesirable because of their contribution to global warming effects.

A number of catalysts and catalytic processes have been reported for the decomposition of halogen-containing organic compounds. A review of the literature reveals that the majority of these catalysts and catalytic processes focus on the decomposition of chlorine-containing compounds, or the destruction of organic compounds which contain only chlorine and fluorine. Bond and Sadeghi, in an article entitled "Catalyzed Destruction of Chlorinated Hydrocarbons", *J.Appl. Chem. Biotechnol*, p. 241 (1975), report the destruction of chlorinated hydrocarbons over a platinum catalyst supported on high surface area alumina.

Karmaker and Green, in an article entitled "An investigation of CFC12 ($Ccl_2F_2$) decomposition on $TiO_2$ Catalyst," *J. Catal*, p. 394 (1995), report the use of a $TiO_2$ catalyst to destroy CFC12 at reaction temperatures between 200 and 400° C. in streams of humid air.

Bickel et al, in an article entitled "Catalytic Destruction of Chlorofluorocarbons and Toxic Chlorinated Hydrocarbons", *Appl. Catal B:Env.* p. 141 (1994), report the use of a platinum catalyst supported on phosphate-doped zirconium oxide for the destruction of CFC113 ($Cl_2FCCClF_2$) in air streams. The catalyst was able to achieve greater than 95% destruction of CFC113 at reaction temperature of 500° C. for approximately 300 hours of continuous operation.

Fan and Yates, in an article entitled "Infrared Study of the Oxidation of Hexafluoropropene on $TiO_2$," *J. Phys. Chem.*, p. 1061 (1994), report the destruction of a perfluoroalkene over $TiO_2$. Perfluoroalkenes differ from perfluoroalkanes in that they contain a carbon-carbon double bond. Although the catalyst was able to readily destroy hexafluoropropylene ($C_3F_6$), the loss of titanium, as $TiF_4$, was evident. The formation of $TiF_4$ would undoubtedly lead to deactivation of the catalyst.

Farris et al, in an article entitled "Deactivation of a $Pt/Al_2O_3$ Catalyst During the Oxidation of Hexafluoropropylene," *Catal. Today,* p. 501 (1992), report the destruction of hexafluoropropylene over a platinum catalyst supported on a high surface area alumina carrier. Although the catalyst could readily destroy hexafluoropropylene at reaction temperatures between 300 and 400° C., deactivation of the catalyst, resulting from the transformation of aluminum oxide to aluminum trifluoride, was severe.

Campbell and Rossin, in a paper entitled "Catalytic Oxidation of Perfluorocyclobutene over a $Pt/TiO_2$ Catalyst," presented at the 14th N. Am. Catal. Soc. Meeting (1995), reported the use of a platinum catalyst supported on high surface area $TiO_2$ carrier to destroy perfluorocyclobutene ($C_4F_6$) at reaction temperatures between 320 and 410° C. The authors note than even at a reaction temperature of 550° C., no conversion of perfluorocyclobutane ($C_4F_8$), a perfluoroalkane, could be achieved using the $Pt/TiO_2$ catalyst. Results presented in this study demonstrate that perfluoroalkanes are significantly more difficult to transform than perfluoroalkenes.

Nagata et al, in a paper entitled "Catalytic Oxidative Decomposition of Chlorofluorocarbons (CFC's) in the Presence of Hydrocarbons", *Appl. Catal. B:Env.*, p. 23 (1994), report the destruction of 1,1,2-trichloro 1,2,2-trifluoroethane (CFC113), 1,2 dichloro 1,1,2,2-tetrafluoroethane (CFC114) and chloropentafluoroethane (CFC115) in the presence of hydrocarbons using a γ-alumina catalyst impregnated with vanadium, molybdenum, tungsten and platinum. The decomposition of the CFC's became more difficult as the number of carbon atoms in the CFC molecule decreased. However, results indicate that as the number of chlorine atoms in the molecule are decreased by replacement with fluorine, the compounds become increasingly more difficult to decompose.

Burdeniue and Crabtree, in an article entitled "Mineralization of Chlorofluorocarbons and Aromatization of Saturated Fluorocarbons by a Convenient Thermal Process", *Science*, p. 340 (1996), report the transformation of cyclic perfluoroalkanes to perfluoroarenes via contact with sodium oxalate to yield sodium fluoride as a reaction product. Both reactions, however, are slow and non-catalytic, since sodium oxalate is stoichiometrically consumed (via transformation into NaF) during the course of the reaction.

This process would not be able to destroy perfluoroalkanes present in streams of air, since the oxygen and/or moisture in the air would readily convert the sodium oxalate to sodium oxide.

SUMMARY OF INVENTION

The present invention is directed to processes for the transformation of perfluoroalkanes and for catalytic compositions used therein. More particularly, the present invention is directed to a process for the transformation of perfluoroalkanes comprising contacting the perfluoroalkanes with aluminum oxide. According to one embodiment, the perfluoroalkane is contacted with aluminum oxide at a temperature ranging from about 400° C. to about 1000° C. According to a further embodiment of the invention, the process for the transformation of a perfluoroalkane comprises contacting the perfluoroalkane with aluminum oxide at a temperature ranging from about 550° C. to about 800° C.

The present invention is also directed to a process for the transformation of perfluoroalkanes comprising contacting the perfluoroalkane with aluminum oxide wherein said aluminum oxide is stabilized, for example, with an element selected from the group consisting of barium, calcium, cerium, chromium, cobalt, iron, lanthanum, phosphorus, magnesium, nickel, silicon, titanium, yttrium, and zirconium. In a further embodiment, the aluminum oxide may be stabilized with molybdenum; tungsten, and vanadium.

According to another embodiment of the present invention, the process of transforming a perfluoroalkane comprises contacting the perfluoroalkane with aluminum oxide in the presence of water and an oxidizing agent.

According to a further embodiment of the invention, the process comprises contacting the perfluoroalkane with a composition comprising aluminum oxide, cobalt, for example, less than 50% by weight cobalt, and, for example, less than 50% by weight of at least one element selected from the group consisting of cerium, titanium, and zirconium.

According to another embodiment of the present invention, the invention is directed to a composition for the transformation of perfluoroalkanes comprising aluminum oxide, and at least one element selected from the group consisting of barium, calcium, cerium, chromium, cobalt, iron, lanthanum, magnesium, molybdenum, nickel, tin, titanium, tungsten, vanadium, yttrium, and zirconium.

According to another embodiment of the present invention, the invention is directed to a composition for the transformation of a perfluoroalkane comprising aluminum oxide, cobalt, for example, less than 50% by weight, and at least one element selected from the group consisting of cerium, titanium, and zirconium, for example, less than 50% by weight of one of said elements.

According to a still further embodiment of the present invention, the invention is directed to a composition for the transformation of a perfluoroalkane comprising aluminum oxide. In one embodiment of the present invention, the aluminum oxide may be stabilized with, for example, an element selected from the group consisting of barium, calcium, cerium, chromium, cobalt, iron, lanthanum, phosphorus, magnesium, nickel, silicon, titanium, yttrium, and zirconium. According to a still further embodiment, the aluminum oxide may be stabilized with an element selected from the group consisting of molybdenum, tungsten, and vanadium.

DETAILED DESCRIPTION OF PREFERRED EMBODIMENTS

The present invention relates generally to a novel catalytic process for the transformation of perfluoroalkanes, such as for example, those vented to the atmosphere during chemical process operations. Examples of these processes include perfluoroalkanes generated during electrolytic aluminum smelting, tetrafluoroethylene manufacture, and during semiconductor manufacture. The process according to the present invention employs aluminum oxide as a catalyst, where the aluminum oxide may be of several phases, such as for example gamma, alpha, delta, kappa and theta, or a combination of phases, with the gamma phase being the preferred phase of aluminum oxide. While testing has shown aluminum oxide will readily destroy perfluoroalkanes at reaction temperatures between 400 and 1,000° C., the useful life-time of the catalyst appears to be limited due to deactivation resulting from an interaction between fluorine atoms liberated during the destruction of the perfluoroalkane and elemental aluminum which comprises the catalyst.

A preferred catalyst composition comprises aluminum oxide with the addition of between 0.01 and 50% of one or more elements selected from a group which include barium, calcium, cerium, chromium, cobalt, iron, lanthanum, phosphorus, magnesium, nickel, silicon, titanium, yttrium and zirconium. A more preferred catalyst consists of aluminum oxide containing cerium, titanium or zirconium, and cobalt. Other useful components which may be added to the aluminum oxide include molybdenum, tungsten or vanadium.

The catalyst may be used in any configuration or size which sufficiently exposes the catalyst to the gas stream being treated. The catalyst composition may be configured in many typical and well-known forms, such as for example, pellets, granules, rings, spheres or cylinders. Alternatively, the catalyst composition may take the form of a coating on an inert carrier, such as ceramic foams, spheres or monoliths. The monolithic form may be preferred when it is desired to reduce the pressure drop through the system or minimize attrition or dusting.

The additional components may be dispersed onto the aluminum oxide by contacting the aluminum oxide with an aqueous or non-aqueous solution containing one or more of these components. Once the impregnation step is completed, the resulting material may be dried and/or calcined. If two or more additional components are to be employed, a preferred method of catalyst preparation may involve sequentially impregnating the aluminum oxide with a solution containing one or more of these added components followed by drying and/or calcining the resulting material. Once this step is completed, the resulting material may be impregnated with a solution containing the same or other of these additional components, followed again by drying and calcining the resulting material. These steps may be repeated until all the additional components have been added in the amount desired. In all cases, the solution containing the additional components may be aqueous or non-aqueous.

Alternatively, the additional components may be added during the preparation of the aluminum oxide. In this instance, the catalyst is prepared by slurrying pseudoboehmite aluminum oxide ($Al_2O_3 \cdot 1.5H_2O$) in an aqueous or non-aqueous liquid with an appropriate mixing device and adjusting the pH to between 1.0 and 6.0 using an appropriate acid, such as nitric, formic or acetic. Once mixed, one or more additional components may be added to the slurry. These additional components may be added as solid metal salts, such as nitrates, acetates, oxalates, chlorides, halides, etc., or may be added as small metal or metal oxide particles, such as for example cerium oxide. Once mixed, the slurry may be aged, if desired, or used directly in the manufacture of beads, particles, spheres, rings, etc., or used to coat an inert ceramic substrate, such as a monolith. Following manufacture or coating of the inert ceramic substrate, the resulting material must be calcined at a temperature between 350 and 900° C., with the preferred calcination temperature being between about 500 and 600° C.

It should be noted that the additional elements added to the aluminum oxide should be highly dispersed throughout the particular configuration used.

If one wishes to manufacture catalyst particles, for example, the resulting slurry described above is first dried, then calcined at a temperature sufficient to form the desired aluminum oxide phase, such as between 500 and 600° C. if one wishes to form the gamma phase of aluminum oxide. Once calcined, the resulting material may be crushed and sieved to the desired mesh size range.

Alternatively, if the monolithic form of the catalyst is desired, the monolithic form may be prepared, for example, by dipping the monolithic substrate into a pseudoboehmite slurry, or a pseudoboehmite slurry containing one or more additional components. Excess slurry may be removed from the channels of the monolithic substrate using an air knife according to procedures well known to one skilled in the art. The catalyst-coated monolith is then dried and calcined at a temperature suitable to achieve the desired form of aluminum oxide. The wash coating procedure can be repeated as often as required until the desired loading of catalyst is achieved. It is desirable that the amount of the catalyst composition coated onto the monolith be in the range of about 25 to about 350 g/liter.

The novel catalytic process of the present invention preferably involves passing a gas stream containing one or more perfluoroalkanes, an oxidizing agent, such as air, and water vapor through a catalyst bed containing a catalyst composition as described herein and heated to the desired operating temperature. The flow rates through the system should be sufficient to allow for greater than at least 80% and preferably greater than 90% so destruction of the perfluoroalkane(s) present in the stream. Thus, the gas hourly spaced velocity (GHSV) can vary significantly over the range of about 500 to about 300,000 $h^{-1}$, and preferably in the range of about 1,000 to about 20,000 $h^{-1}$. The process described herein may be operated at temperatures between about 400° C. to about 1,000° C., with the preferred temperature range between about 500 and 800° C.

The process described according to the present invention is also applicable to the injection of gaseous or liquid phase perfluoroalkanes or mixtures of perfluoroalkanes into a gas stream, including an oxidizing agent, such as air for example, and water. The gas stream temperature and flow rate, and rate of perfluoroalkane(s) injection, may be controlled to achieve the desired concentration of perfluoroalkane(s) to be treated. The resulting gas stream containing the perflouoroalkane(s) is then contacted with the catalyst compositions described herein.

It should also be noted that after the gas stream has been treated in accordance with the present invention, further treatment, if desired, may be necessary to remove hydrofluoric acid (formed during the decomposition of the perfluoroalkanes in the presence of an oxidizing agent and water) from the effluent stream. If the concentration of hydrofluoric acid in the effluent stream is deemed unacceptable, conventional collection or abatement processes, such as caustic scrubbing, may be employed to avoid venting acid gases directly into the atmosphere.

In the more preferred embodiments of the present invention, a relatively small percentage, such as about 0.01 to 5% of a base or noble metal, appear to aid the complete conversion of carbon monoxide to carbon dioxide in the reaction products. In this connection it has not been observed that noble metals perform better than base metals.

Under certain operating conditions, aluminum oxide alone may not possess the required useful life and may degrade faster than desirable warranting replacement of the catalyst following a short period of operation. However, the aluminum oxide may be used to treat process streams containing low to moderate concentrations of perfluoroalkanes using a fluidized bed reactor configuration employing aluminum oxide particles of a fluidizable size. Using this reactor configuration would allow for removing catalyst from the reactor during process operation while simultaneously adding fresh catalyst in order to maintain a satisfactory threshold activity of the reactor over a sustained useful period.

The compositions of the catalysts recited herein are stated in percent by weight unless otherwise indicated and were calculated based upon the elements described. When the metal component or components were added by wet impregnation techniques, the weight percent of the metal component(s) were calculated from the concentration of metal(s) within the impregnation solution and the amount of impregnation solution used to prepare the catalyst. When the metal component or components were added to the aluminum oxide precursor (e.g. pseudoboehmite) slurried in water, the weight percent of the metal component(s) were calculated from the amount of aluminum oxide precursor and the amount of metal(s) present within the slurry, and the weight loss upon ignition of the aluminum oxide precursor (e.g. 20–30% for pseudoboehmite).

The concentration of CO, $CO_2$ and perfluoroalkane in the reactor effluent in the following examples described herein were determined using gas chromatographic techniques employing packed columns and both thermal conductivity and flame ionization detectors. The above analytical techniques are well known to those skilled in the art.

The additional components added to the aluminum oxide catalyst appear to improve the effective useful life of the aluminum oxide catalyst by maintaining the reactivity of the aluminum oxide at a high level for greater periods of time. This may be referred to as a stabilizing effect.

In view of the above description and the examples of the process according to the present invention which follow, it should be understood by those skilled in the art that the present invention provides processes and catalyst compositions which very effectively transform perfluoroalkanes.

EXAMPLE I

Aluminum oxide was prepared by first adding approximately 1.0 liter of distilled, deionized water to a 3.5 liter jar and stirring with a laboratory scale mixer. 500 g of pseudoboehmite alumina was slowly added to the water while stirring. The pH of the slurry was adjusted to approximately 3.3 using nitric acid, and the slurry was allowed to stir overnight. In the morning, the slurry was covered and allowed to age for three days. Following aging, the slurry was mixed for approximately one hour using the laboratory scale mixer, then poured into a drying pan. The drying pan containing the slurry was placed into an oven and heated to between 100 and 125° C. until dry. Following drying, the resulting solids were calcined at 535° C.

Following calcination, the above material was crushed and sieved to 40/60 mesh granules. 3.0 g (7.5 $cm^3$) of catalyst were loaded into a 1.0 cm o.d. stainless steel reactor and heated to 750° C. The catalyst was then exposed to 500 ppm hexafluoroethane ($C_2F_6$) in humid air (2.1 volume percent water) at a gas hourly spaced velocity of 1,440 $hr^{-1}$. The reactor temperature was decreased at approximately 80° C./hr, and the effluent stream was sampled for the concentration of $CO_2$ and $C_2F_6$ at discrete periods of time. The conversion of $C_2F_6$ as a function of temperature is reported below:

| Temperature, °C. | Conversion, % |
| --- | --- |
| 720 | 99.5 |
| 667 | 93.1 |
| 634 | 74.3 |
| 589 | 30.5 |
| 552 | 11.7 |
| 511 | 3.0 |

EXAMPLE II

The catalyst prepared to according to Example I was evaluated for stability by exposing 2.4 g (6.0 cm$^3$) of 12–20 mesh catalyst to a gas stream containing 500 ppm $C_2F_6$, 2.8 volume percent water with the balance air at a gas hourly space velocity of 1,800 h$^{-1}$ at 700° C. The conversion of $C_2F_6$ decreased from 95% to less than 90% in 18.5 hours and less than 80% in 32.5 hours and less than 60% upon termination of the run (52.5 hours).

EXAMPLE III

The catalyst prepared according to Example I was evaluated for stability by exposing 1.0 g (2.5 cm$^3$) of 40/60 mesh catalyst to a gas stream containing 1,000 ppm $C_2F_6$, 3.6 volume percent water with the balance air at a gas hourly space velocity of 4,320 hr$^{-1}$ at 800° C. The conversion of $C_2F_6$ remained greater than 99.5% for approximately 12 hours, after which, the conversion of $C_2F_6$ decreased to approximately 95% in 19.5 hours, and to approximately 88% upon termination of the run (24.5 hours).

Results presented in Examples I, II and III demonstrate that while the aluminum oxide catalyst is able to achieve greater than 90% destruction of $C_2F_6$, the conversion of $C_2F_6$ rapidly decreases with increasing exposure time.

EXAMPLE IV

A magnesium-aluminum oxide catalyst composition was prepared by first adding approximately 1.5 liters of distilled, deionized water to a 3.5 liter jar and stirring with a laboratory scale mixer. 1,000 g of pseudoboehmite alumina was slowly added to the water while stirring. The Ph of the slurry was adjusted to approximately 3.3 using nitric acid. To the slurry was then added approximately 50 g magnesium nitrate and an additional 250 ml of distilled, deionized water. The slurry was allowed to stir for approximately one hour, and an additional 24.6 g magnesium nitrate plus 150 ml distilled, deionized water was added to the slurry. The slurry was then allowed to stir overnight. In the morning, the slurry was covered and allowed to age for three days. Following aging, the slurry was mixed for approximately one hour using a laboratory scale mixer, then poured into a drying pan. The drying pan containing the slurry was placed into an oven and heated to between 110° C. and 125° C. until dry. Following drying, the resulting solids were calcined at 535° C. The resulting material was approximately 0.85% by weight magnesium.

Following calcination, the above material was crushed and sieved to 40/60 mesh granules. 3.0 g (6.0 cm$^3$) of catalyst were loaded into a 1.0 cm o.d. reactor and heated to 500° C. The catalyst was then exposed to 500 ppm hexafluoroethane ($C_2F_6$) in humid air (2.1 volume percent water) at a gas hourly space velocity of 1,800 hr$^{-3}$. The reactor temperature was increased at approximately 80° C./hr, and the effluent stream was sampled for the concentration of $CO_2$ and $C2F_6$ at discrete periods of time. The conversion of $C_2F_6$ as a function of temperature is reported below:

| Temperature, °C. | Conversion, % |
| --- | --- |
| 720 | 99.5 |
| 690 | 96.7 |
| 655 | 83.9 |
| 614 | 51.6 |
| 575 | 16.5 |
| 523 | 5.3 |

EXAMPLE V

A lanthanum-aluminum oxide composition was prepared by first adding approximately 1.5 liters of distilled, deionized water to a 3.5 liter jar and stirring with a laboratory scale mixer. 1000 g of pseudoboehmite alumina was slowly added to the water while stirring. The pH of the slurry was adjusted to approximately 3.3 using nitric acid. To the slurry was then added approximately 21 g lanthanum nitrate hydrate. The slurry was then allowed to stir overnight. In the morning, the slurry was covered and allowed to age for three days. Following aging, the slurry was mixed for approximately one hour using a laboratory scale mixer, then poured into a drying pan. The drying pan containing the slurry was placed into an oven and heated to between 110° C. and 1250° C. until dry. Following drying, the resulting solids were calcined at 535° C. The resulting material was approximately 1.0% by weight lanthanum.

Following calcination, the above material was crushed and sieved to 40/60 mesh granules. 3.0 g (6.0 cm$^3$) of the catalyst composition were loaded into a 1.0 cm o.d. reactor and heated to 500° C. The catalyst was then exposed to 500 ppm hexafluoroethane ($C_2F_6$) in humid air (2.1 volume percent water) at a gas hourly space velocity of 1,800 hr$^{-1}$. The reactor temperature was increased at approximately 80° C./hr, and the effluent stream was sampled for the concentration of $CO_2$ and $C_2F_6$ at discrete periods of time. The conversion of $C_2F_6$ as a function of temperature is reported below:

| Temperature, °C. | Conversion, % |
| --- | --- |
| 704 | 91.2 |
| 679 | 83.0 |
| 652 | 67.3 |
| 621 | 43.4 |
| 588 | 22.2 |
| 517 | 2.6 |

EXAMPLE VI

A chromium-aluminum oxide catalyst composition was prepared by first adding approximately 1.5 liters of distilled, deionized water to a 3.5 liter jar and stirring with a laboratory scale mixer. 1,000 g of pseudoboehmite alumina was slowly added to the water while stirring. The pH of the slurry was adjusted to approximately 3.3 using nitric acid. To the slurry was then added approximately 44.7 g chromium nitrate hydrate. The slurry was then allowed to stir overnight. In the morning, the slurry was covered and allowed to age for three days. Following aging, the slurry was mixed for approximately one hour using a laboratory scale mixer, then poured into a drying pan. The drying pan containing the slurry was placed into an oven and heated to between 110 and 125° C. until dry. Following drying, the resulting solids were calcined at 535° C. The resulting material was approximately 0.8 wt % chromium.

Following calcination, the above material was crushed and sieved to 6/10 mesh granules. 26.5 g(50 cm$^3$) catalyst were loaded into a 2.5 cm o.d. reactor and heated to 450° C. The catalyst was then exposed to 500 ppm hexafluoroethane ($C_2F_6$) in humid air (2.1 volume percent water) at a gas hourly space velocity of 1,800 hr$^{-1}$. The reactor temperature was increased at approximately 100° C./hr, and the effluent stream was sampled for the concentration of $CO_2$ and $C_2F_6$ at discrete periods of time. The conversion of $C_2F_6$ as a function of temperature is reported below:

| Temperature, ° C. | Conversion, % |
|---|---|
| 752 | 99.5 |
| 704 | 95.8 |
| 653 | 82.3 |
| 602 | 58.0 |
| 550 | 19.1 |
| 500 | 6.4 |

EXAMPLE VII

The catalyst prepared according to Example VI was evaluated for stability by exposing 26.5 g (50 cm$^3$) of 6/10 mesh catalyst particles to a gas stream containing 500 ppm $C_2F_6$, 2.1 volume percent water with the balance air at a gas hourly space velocity of 1,800 hr$^{-1}$ at 700° C. The effluent stream was sampled for the concentration of $CO_2$ and $C_2F_6$ every 45 minutes throughout the 19 hour run. The conversion of $C_2F_6$ remained constant at 94.1±0.32% throughout the duration of the run.

Results presented in Example VII demonstrate that the addition of chromium to the aluminum oxide improves the stability or life of the catalyst.

EXAMPLE VIII

A cobalt-aluminum oxide was prepared by impregnating to incipient wetness 7.10 g of 12/20 mesh aluminum oxide prepared according to Example I with an aqueous solution containing 3.4 wt % cobalt. The solution was prepared by dissolving 3.0 g cobalt acetate and 3.0 g triethanolamine in 15 ml distilled, deionized water. Following impregnation, the material was dried at 120° C. followed by calcining at 450° C. The resulting material was 4.0 wt % cobalt.

EXAMPLE IX

The catalyst prepared according to Example VIII was evaluated for stability by exposing 1.0 g (2.0 cm$^3$) of 12/20 mesh catalyst particles to a gas stream containing 1,000 ppm $C_2F_6$, 2.7 volume percent water with the balance air at a gas hourly space velocity of 6,000 hr$^{-1}$ at 800° C. for 43 hours. The effluent stream was sampled every hour for $CO_2$ and $C_2F_6$. The conversion of $C_2F_6$ remained constant at 89.6±0.10% throughout the remainder of the run.

Results presented in Example IX demonstrate that the addition of cobalt to the aluminum oxide improves the stability of the catalyst.

EXAMPLE X

A cerium-aluminum oxide catalyst was prepared by first adding approximately 1.5 liters of distilled, deionized water to a 3.5 liter jar and stirring with a laboratory scale mixer. 650 g of pseudoboehmite alumina was slowly added to the water while stirring. The pH of the slurry was adjusted to approximately 3.3 using nitric acid. To the slurry was then added approximately 70 g cerium nitrate hydrate. The slurry was then allowed to stir overnight. In the morning, the slurry was covered and allowed to age for 32 hours. Following aging, a 35 g portion of slurry was removed and dried at 125° C. Following drying, the resulting solids were calcined by heating to 535° C. at 7° C./min and maintaining this temperature for 2 hours, then heating to 900° C. at 5° C./min and maintaining this temperature for 1 hour. The resulting material was approximately 5.0% by weight cerium.

Following calcination, the above material was crushed and sieved to 40/60 mesh granules. 3.0 g (6.0 cm$^3$) catalyst were loaded into a 1.0 cm o.d. reactor and heated to 575° C. The catalyst was then exposed to 500 ppm hexafluoroethane ($C_2F_6$) in humid air (2.1 volume percent water) at a gas hourly space velocity of 1,800 hr$^{-1}$. The reactor temperature was increased at approximately 80° C./hr, and the effluent stream was sampled for the concentration of $CO_2$ and $C_2F_6$ at discrete periods of time. The conversion of $C_2F_6$ as a function of temperature is reported below:

| Temperature, ° C. | Conversion, % |
|---|---|
| 749 | 99.5 |
| 699 | 90.0 |
| 660 | 72.3 |
| 609 | 37.2 |
| 575 | 7.7 |

EXAMPLE XI

The catalyst prepared according to Example X was evaluated for stability by exposing 1.0 g (2.5 cm$^3$) of 40/60 mesh catalyst particles to a gas stream containing 500 ppm $C_2F_6$, 2.1 volume percent water with the balance air at a gas hourly space velocity of 1,550 hr$^{-1}$ at 700° C. The effluent stream was sampled every hour for $CO_2$ and $C_2F_6$. Throughout the 17.5 hour duration of the test, the conversion of $C_2F_6$ remained constant at about 69.01±0.16%.

EXAMPLE XII

The cerium-aluminum oxide slurry prepared according to Example X was coated onto a monolithic substrate by dipping four 5×5×5 cm piece of substrate with a cell density of 62 channel/cm$^2$ into the slurry. The channels were cleared of excess slurry by blowing air through the channels using an air knife. The pieces of monolith were then dried and calcined at 535° C. for 2 hours. Once calcined, the coating procedure was repeated, and the final material was again dried and calcined at 535° C. for 2 hours. The catalyst loading following calcination was approximately 110 g/liter of monolith.

Following calcination, 2.5 cm diameter cores of monolith were cut from the blocks using a core saw. Two cores were loaded into a 2.5 cm diameter stainless steel reactor and heated to 550° C. in flowing, humid air. The catalyst was then exposed to 500 ppm hexafluoroethane ($C_2F_6$) in humid air (2.1 volume percent water) at a gas hourly space velocity of 1,800 hr$^{-1}$. The reactor temperature was increased at approximately 100° C./hr, and the effluent stream was sampled for the concentration of $CO_2$ and $C_2F_6$ at discrete periods of time. The conversion of $C_2F_6$ as a function of temperature is reported below:

| Temperature, ° C. | Conversion, % |
| --- | --- |
| 805 | 93.2 |
| 745 | 65.3 |
| 698 | 48.7 |
| 650 | 28.4 |
| 601 | 10.2 |
| 555 | 1.2 |

Results reported above demonstrate that the catalyst can be coated onto a monolith and used to transform perfluoroalkanes.

EXAMPLE XIII

A zirconium-aluminum oxide catalyst was prepared by first adding approximately 1.5 liters of distilled, deionized water to a 3.5 liter jar and stirring with a laboratory scale mixer. 750 g of pseudoboehmite alumina was slowly added to the water while stirring. The pH of the slurry was adjusted to approximately 3.3 using nitric acid. Approximately 750 g of zirconium hydroxide was then added to the slurry and the pH of the slurry was adjusted to approximately 3.3 using nitric acid. The slurry was then allowed to stir overnight. In the morning, the slurry was covered and allowed to age for three days. Following aging, approximately 50 g of slurry was removed and dried at 125° C. Following drying, the resulting solids were calcined by heating to 535° C. at 7° C./min and maintaining this temperature for 2 hours, then heating to 900° C. at 5° C./min and maintaining this temperature for 1 hour. The resulting composition contained approximately 50%. by weight zirconium oxide.

Following calcination, the above material was crushed and sieved to 40/60 mesh granules, 3.0 g(6.0 cm$^3$) catalyst were loaded into a 1.0 cm o.d. reactor and heated to 550° C. The catalyst was then exposed to 500 ppm hexafluoroethane ($C_2F_6$) in humid air (2.1 volume percent water) at a gas hourly space velocity of 1,800 hr$^{-1}$. The reactor temperature was increased at approximately 80° C./hr, and then the effluent stream was sampled for the concentration of $C_2$ and $C_2F_6$ at discrete period of time. The conversion of $C_2F_6$ as a function of temperature is reported below:

| Temperature, ° C. | Conversion, % |
| --- | --- |
| 800 | 99.5 |
| 746 | 84.5 |
| 694 | 50.7 |
| 655 | 31.6 |
| 611 | 11.5 |
| 550 | 0.4 |

EXAMPLE XIV

A zirconium-aluminum oxide catalyst was prepared by first adding approximately 1.5 liters of distilled, deionized water to a 3.5 liter jar and stirring with a laboratory scale mixer. 1.0 kg of pseudoboehmite alumina was slowly added to the water while stirring. To the slurry was added 105 g of a zirconium oxynitrate (20% zirconia) solution. The Ph of the slurry was adjusted to approximately 3.3 using nitric acid. The slurry was then allowed to stir overnight. In the morning, the slurry was covered and allowed to age for three days. Following aging, the slurry was removed and dried at 125° C. Following drying, the resulting solids were calcined by heating to 535° C. at 7° C./min and maintaining this temperature for 2 hours. The resulting material was approximately 3% by weight zirconium oxide.

Following calcination, the above material was crushed and sieved to 10/18 mesh granules. 28.2 g (50 cm$^3$) catalyst were loaded into a 1.0 cm o.d. reactor and heated to 520° C. The catalyst was then exposed to 500 ppm hexafluoroethane ($C_2F_6$) in humid air (2.1 volume percent water) at a gas hourly space velocity of 1,800 hr$^{-1}$. The reactor temperature was increased at approximately 100° C./hr, and the effluent stream was sampled for the concentration of $CO_2$ and $C_2F_6$ at discrete periods of time. The conversion of $C_2F_6$ as a function of temperature is reported below:

| Temperature, ° C. | Conversion, % |
| --- | --- |
| 700 | 99.5 |
| 649 | 88.8 |
| 594 | 61.4 |
| 542 | 23.2 |
| 520 | 12.9 |

EXAMPLE XV

The catalyst prepared according to Example XIV was evaluated for stability by exposing 69 g (120 cm$^3$) of 6/10 mesh catalyst particles to a gas stream containing 500 ppm $C_2F_6$, 2.1 volume percent water with the balance air at a gas hourly space velocity of 1,800 hr$^{-1}$ at 700° C. The effluent stream was sampled every hour for $CO_2$ and $C_2F_6$. $CO_2$ was the only carbon-containing reaction product detected in the reactor effluent stream. The conversion of $C_2F_6$ increased from 90 to 95% during the first 20 hours of the run, and remained greater than 90% for approximately 340 hours of reaction exposure. Following 340 hours, the conversion of $C_2F_6$ decreased to less than 90%.

EXAMPLE XVI

A more preferred catalyst was prepared by impregnating to incipient wetness 200 g of 6/12 mesh of the 3% zirconia-alumina catalyst prepared according to Example XIV using an aqueous solution containing 4.3 wt % cobalt. The solution was prepared by dissolving 80.0 g cobalt acetate and 60.0 g triethanolamine in 300 ml distilled, deionized water. Following impregnation, the material was dried at 120° C., then calcined at 450° C. The resulting material was 5.0 wt %

EXAMPLE XVII

The catalyst prepared according to Example XVI was evaluated for stability by exposing 90 g (150 cm$^3$) of 6/12 mesh catalyst particles to a gas stream containing 500 ppm $C_2F_6$, 3.2 volume percent water with the balance air at a gas hourly space velocity of 1,800 hr$^{-1}$ at 700° C. The effluent stream was sampled every hour for $CO_2$ and $C_2F_6$. $CO_2$ was the only carbon-containing reaction product detected in the reactor effluent stream. The conversion of $C_2F_6$ increased from 88 to 98% during the first 25 hours of the run, then remained constant at 98% throughout the duration of the 400 hour run.

EXAMPLE XVIII

The catalyst prepared according to Example XVI was evaluated for stability by exposing 1.0 g (1.8 cm$^3$) of 40/60 mesh catalyst particles to a gas stream containing 1000 ppm $C_2F_6$, 3.6 volume percent water with the balance air at a gas hourly space velocity of 6,000 hr$^{-1}$ at 800° C. The effluent stream was sampled every hour for $CO_2$ and $C_2F_6$. $CO_2$ was the only carbon-containing reaction product detected in the reactor effluent stream. The conversion of $C_2F_6$ increased from 90 to 95% during the first 7 hours of reaction exposure. The conversion of $C_2F_6$ remained greater than 90% throughout the duration of the 78 hour run.

EXAMPLE XIX

The catalyst prepared according to Example XIV was crushed and sieved to 12/20 mesh, then exposed to 5,000 ppm tetrafluoromethan ($CF_4$) in humid air (2.7 volume percent water) at a gas hourly space velocity of 2,000 hr$^{-1}$ at 750° C. The reactor temperature was decreased at approximately 70° C./hr, and the effluent stream was sampled for the concentration of $CO_2$ and $CF_4$ at discrete periods of time. The conversion of $CF_4$ as a function of temperature is reported below:

| Temperature, ° C. | Conversion, % |
| --- | --- |
| 750 | 97.4 |
| 700 | 65.8 |
| 650 | 34.2 |
| 600 | 10.5 |

In view of the foregoing description and examples, it should be readily appreciated that aluminum oxide represents an effective catalyst for the transformation of perfluoroalkanes and that its effective useful life can be expanded by the addition of one or more of the additional components described herein in a process according to the present invention.

What is claimed is:

1. A process for the destruction of perfluoroalkanes, the process comprising contacting a gas stream and a catalyst; wherein:

the gas stream comprises water and one or more perfluoroalkanes;

the catalyst comprises aluminum oxide; and the contacting step is performed at a temperature and gas hourly space velocity sufficient to reduce the concentration of the perfluoroalkanes in the gas stream.

2. The process of claim 1, wherein the aluminum oxide is gamma phase, delta phase, kappa phase, theta phase, or mixtures thereof.

3. The process of claim 1, wherein:

the catalyst further comprises zirconium; and the catalyst is from about 0.01 weight % to about 50 weight % $ZrO_2$.

4. The process of claim 1 wherein:

the catalyst further comprises cobalt; and the catalyst is from about 0.01 weight % to about 50 weight % cobalt.

5. The process of claim 1 wherein the catalyst further comprises:

from about 0.01 weight % to about 50 weight % $ZrO_2$; and from about 0.01 weight % to about 50 weight % cobalt, wherein the aluminum oxide is present at about at least 50 weight %.

6. The process of claim 1, 2, 3, 4, or 5 wherein the catalyst further comprises about 0.01 weight % to about 5 weight % of a base metal.

7. The process of claim 1, 2, 3, 4 or 5 wherein the catalyst further comprises about 0.01 weight % to about 5 weight % of a noble metal.

8. The process of claim 1, 2, 3, 4 or 5, wherein the gas stream and the catalyst are contacted at a temperature of about 400° C. to about 1000° C.

9. The process of claim 7, wherein the temperature is about 500° C. to about 800° C.

10. The process of claim 8, wherein the temperature is about 500° C. to about 800° C.

11. The process of claim 1, wherein the gas stream further comprises an oxidizing agent.

12. The process of claim 1, 2, 3, 4 or 5, wherein the catalyst is coated on an inert carrier.

13. The process of claim 1, wherein the perfluoroalkane comprises $CF_4$, $C_2F_6$, $C_3F_8$, $C_4F_8$, or $C_4F_{10}$.

14. The process of claim 1, wherein the gas hourly space velocity is about 500 hour$^{-1}$ to about 300,000 hour$^{-1}$.

15. The process of claim 1, wherein the gas hourly space velocity is about 1000 hour$^{-1}$ to about 20,000 hour$^{-1}$.

16. The process of claim 1, wherein the contacting step reduces the concentration of perfluoroalkanes in the gas stream at least 80%.

17. The process of claim 1, wherein the contacting step reduces the concentration of perfluoroalkanes in the gas stream by at least 90%.

18. The process of claim 1, wherein the gas stream further comprises oxygen.

19. The process of claim 1, wherein the catalyst is present in the form of a pellet, granule, ring, sphere, or cylinder.

20. The process of claim 1, wherein the catalyst consists essentially of gamma phase aluminum oxide, zirconium oxide, cobalt, and a noble metal.

* * * * *